(12) United States Patent
Dragsted

(10) Patent No.: US 7,444,977 B2
(45) Date of Patent: Nov. 4, 2008

(54) METHOD AND SYSTEM FOR REDUCING FUEL CONSUMPTION IN A DIESEL ENGINE

(75) Inventor: Jorn Dragsted, Allerod (DK)

(73) Assignee: A.P. Moller-Maersk A/S (DK)

(*) Notice: Subject to any disclaimer, the term of this patent is extended or adjusted under 35 U.S.C. 154(b) by 0 days.

(21) Appl. No.: 11/284,436

(22) Filed: Nov. 21, 2005

(65) Prior Publication Data

US 2006/0112925 A1 Jun. 1, 2006

Related U.S. Application Data

(60) Provisional application No. 60/631,785, filed on Nov. 30, 2004.

(30) Foreign Application Priority Data

Nov. 30, 2004 (DK) .......................... PA 2004 01870
Dec. 22, 2004 (WO) ............... PCT/DL2004/000903

(51) Int. Cl.
*F01M 5/00* (2006.01)
(52) U.S. Cl. .............................. 123/196 AB; 123/196 R
(58) Field of Classification Search ............. 123/196 R, 123/196 AB, 41.33
See application file for complete search history.

(56) References Cited

U.S. PATENT DOCUMENTS

| | | | | |
|---|---|---|---|---|
| 2,400,910 | A | * | 5/1946 | Booth ........................ 73/54.09 |
| 3,763,960 | A | * | 10/1973 | Veit ........................... 184/6.13 |
| 5,485,895 | A | | 1/1996 | Peterson et al. |
| 5,559,704 | A | * | 9/1996 | Vanek et al. .................... 701/99 |
| 5,964,318 | A | * | 10/1999 | Boyle et al. .................... 184/1.5 |
| 5,979,420 | A | | 11/1999 | Kawamura .................. 123/557 |
| 6,134,947 | A | * | 10/2000 | Kwun ....................... 73/35.12 |
| 6,418,887 | B1 | | 7/2002 | Okamoto |

(Continued)

FOREIGN PATENT DOCUMENTS

GB  2 312 246  10/1997

(Continued)

OTHER PUBLICATIONS

WPI/Derwent Abstract of EP 01 123 620 dated Oct. 31, 1984.

(Continued)

*Primary Examiner*—Stephen K. Cronin
*Assistant Examiner*—Ka Chun Leung
(74) *Attorney, Agent, or Firm*—Morgan, Lewis & Bockius LLP

(57) ABSTRACT

The present invention relates to a method (and corresponding system) of reducing fuel consumption in a diesel engine (300) when operating at less than full power, the method comprising the step of: adjusting (101) a viscosity of a system oil (301) from the engine (300) resulting in a modified system oil (301'), where the viscosity is adjusted so that the mechanical efficiency of the engine (300) is increased when the modified system oil (301') is provided to the engine (300) and wherein the step of adjusting is done on the basis at least one parameter representing an actual load of the engine (300) and a viscosity parameter of the system oil (301).

In this way, the mechanical efficiency of the engine when operating at less than full speed/at partial speed is increased. This reduces the fuel consumption of a diesel engine and reduces the emissions of a diesel engine.

8 Claims, 1 Drawing Sheet

U.S. PATENT DOCUMENTS

| | | | |
|---|---|---|---|
| 6,510,830 B2 * | 1/2003 | Rossiter | 123/196 AB |
| 6,575,018 B2 * | 6/2003 | Berndorfer et al. | 73/54.01 |
| 6,725,707 B1 * | 4/2004 | Lin et al. | 73/54.01 |
| 6,895,807 B2 * | 5/2005 | Han et al. | 73/53.05 |
| 6,901,788 B2 * | 6/2005 | Han et al. | 73/53.05 |
| 6,955,150 B2 * | 10/2005 | Moss | 123/196 AB |
| 2003/0005751 A1 * | 1/2003 | Berndorfer et al. | 73/54.01 |
| 2003/0101801 A1 * | 6/2003 | Wilson et al. | 73/54.01 |
| 2004/0211246 A1 * | 10/2004 | Han et al. | 73/53.05 |
| 2005/0039521 A1 * | 2/2005 | Han et al. | 73/53.05 |
| 2005/0066710 A1 * | 3/2005 | Lin | 73/54.42 |

FOREIGN PATENT DOCUMENTS

| | | |
|---|---|---|
| JP | 57-70908 | 5/1982 |
| JP | 59-60013 | 4/1984 |
| JP | 59-145312 | 8/1984 |

OTHER PUBLICATIONS

Patent Abstracts of Japan of JP 61-135911 dated Jun. 23, 1986.
Patent Abstracts of Japan of JP 57-70908 dated May 1, 1982.
Patent Abstracts of Japan of JP 59-145312 dated Aug. 20, 1984.
Patent Abstracts of Japan of JP 59-60013 dated Apr. 5, 1984.
Patent Abstracts of Japan of JP 54-89138 dated Jul. 14, 1979.
Patent Abstracts of Japan of JP 2005-76608 dated Mar. 24, 2005.
Patent Abstracts of Japan of JP 01-80717 (64-80717) dated Mar. 27, 1989.

* cited by examiner

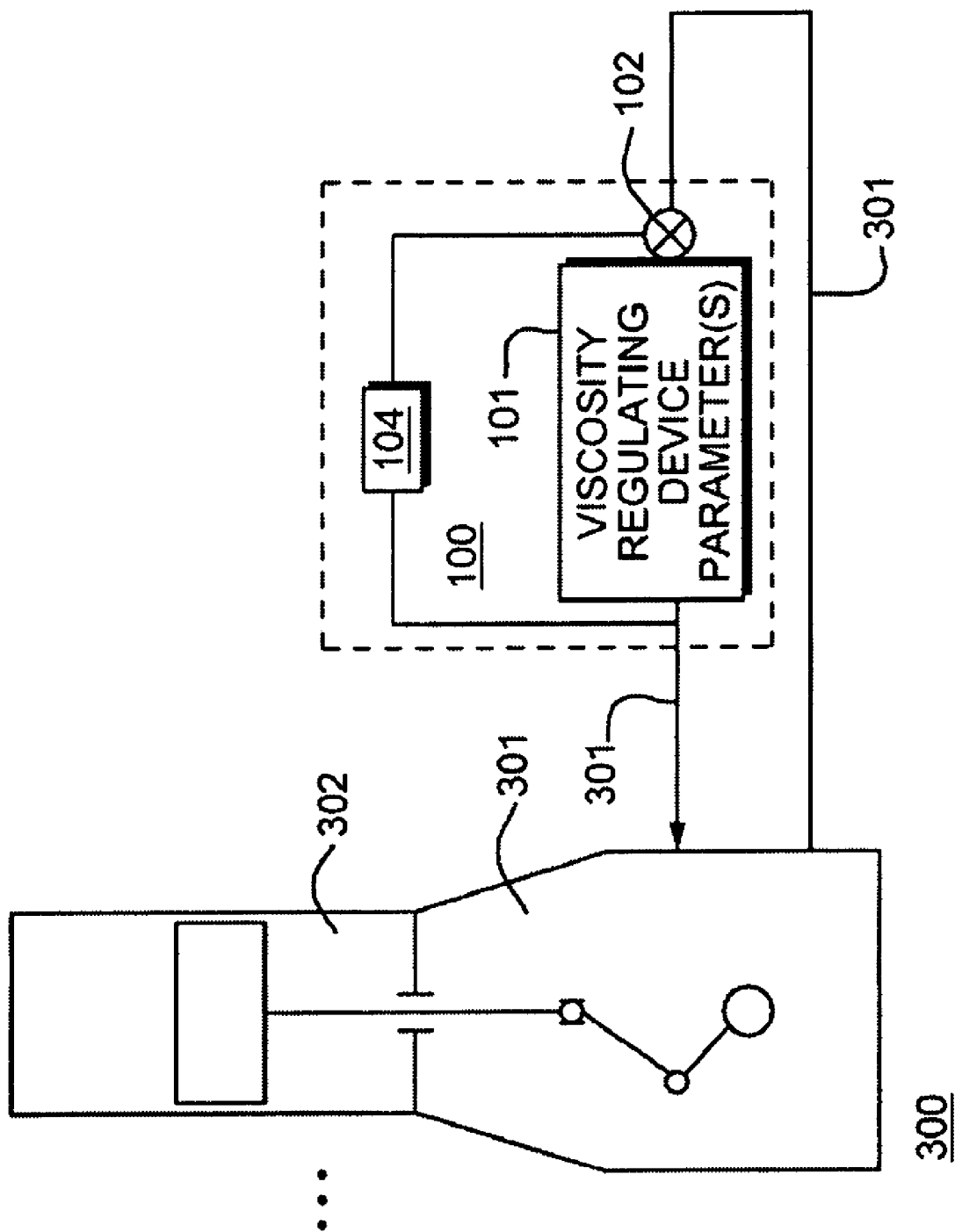

METHOD AND SYSTEM FOR REDUCING FUEL CONSUMPTION IN A DIESEL ENGINE

This application claims the benefit of U.S. Provisional Application No.: 60/631,785 filed 30 Nov. 2004 and incorporates the same by reference.

FIELD OF THE INVENTION

The invention relates to a method of reducing fuel consumption in a diesel engine when operating at less than full speed. Further, the invention relates to a system for reducing fuel consumption in a diesel engine when operating at less than full speed.

BACKGROUND OF THE INVENTION

Diesel engines used onboard certain types of vessels and/or used in certain stationary applications are typically of the well known two-stroke type or of the well known four-stroke type.

Two-stroke cross-head engines used in marine and/or stationary applications are equipped with two separate lubricating oil systems. One lubricating system comprises so-called system oil/system lubricant that normally is used for lubrication and cooling of the engine's bearings and e.g. oil-cooled pistons as well as for activation and/or control of various valves or the like. The other lubricating system comprises an all-loss lubricant (cylinder oil/cylinder lubricant) that normally is used for lubrication of the engine's cylinders, piston rings and piston skirt.

In typical two-stroke cross-head engines, the cylinder oil is spent continuously by each turn of the engine whereas the system oil in principle is not spent (except by smaller unintentional leakages). The lubrication system comprising the cylinder oil is also often referred to as an "all-loss" lubrication system as the oil is spent. The use of and various types of both system oil(s) and cylinder oil(s) is very well known in the art.

Typical cylinder oils usually have an SAE (Society of Automotive Engineering) viscosity equivalent to about 50 and normally have a total base number (BN) of about 40 to 70 for the neutralisation of acid products produced during the combustion process. Typical system oils usually have an SAE viscosity of about 30 with a relatively low BN content, typically below 10. These exemplary values may vary dependent on the actual application and the specific design of the systems that the oils are used in.

In recent two-stroke cross-head engine designs involving electronic and/or hydraulic control and/or activation of valves, etc., the minimum performance requirements of the system oil has been substantially increased compared to earlier design using traditional mechanical control/activation.

Four-stroke, trunk piston (diesel) engines, however, typically use only a single oil type for lubrication and cooling. Such engines are typically used as secondary/auxiliary or propulsion engines on ships, or in stationary power generation or liquid/gas transmission applications. Such used oils typically have a SAE viscosity of about 30 or 40. While the system oil of two-stroke cross-head engines typically remains within its specified performance limits for an extended period of time, trunk piston engine oils are constantly affected by exposure to the combustion process.

The performance level of lubricants is typically measured periodically and may not go beyond certain limits if the oiled component's condition should not be jeopardized.

Another characteristic of diesel engines is that their mechanical efficiency is reduced significantly for reduced engine power or speed or output (forth only referred to as engine power). This results in an increased specific fuel consumption of the particular engine when the engine is operating at reduced power. An additional characteristic is that the stress of the bearings in the engine is reduced for reduced engine power. Further, the thickness of the oil film on the engine parts is increased at reduced engine power compared to the thickness at full/maximum engine output thereby reducing the load of the engine components. This holds for all types of bearings that is a part of the engine's crank mechanism when the temperature of the lubricating oils is kept substantially constant regardless of the load of the engine, which always is aimed for, by suitable adjustment of the amount of lubricating oil that is fed through the related oil coolers usually using water as a coolant.

The actual power of an engine implicitly defines the actual pressure condition in the engine's cylinders, i.e. maximal pressure, compression pressure and mean pressure, which are the main determining factors for the stress or strain on the bearings. The number of revolutions is also a known function of the load of the engine for engines that are directly coupled to a propeller.

Additionally, the stress or strain of the bearings will at any time be influenced by the specific viscosity of the system oil, which may ongoing be influenced e.g. by pollution of the oil during operation of the engine.

A diesel engine's frictional loss is mainly of a viscose character. An increase in the viscosity of the system oil will therefore result in a diminished efficiency, increased fuel consumption and increased emissions.

OBJECT AND SUMMARY OF THE INVENTION

It is an object of the present invention to provide a method of and a corresponding system for reducing fuel consumption in a diesel engine when operating at less than full power that solves the above-mentioned (and other) shortcomings. A further object is to provide this in a simple and efficient way.

An additional object of the present invention is to increase the mechanical efficiency and to reduce the fuel consumption of a diesel engine when the engine is operating at less than full power.

Another object is to reduce the emissions of a diesel engine when the engine is operating at less than full power.

These objects, among others, are achieved by a method (and a corresponding system) of reducing fuel consumption in a diesel engine, the method comprising the step of: adjusting, when the engine is operating at less than full power, a viscosity of a system oil from the engine resulting in a modified system oil, where the viscosity is adjusted so that the mechanical efficiency of the engine is increased when the modified system oil is provided to the engine and wherein the step of adjusting is done on the basis at least one parameter representing an actual load of the engine and a viscosity parameter of the system oil.

In this way, the mechanical efficiency of the engine when operating at less than full speed/partial speed is increased since a change of the viscosity of a lubricating oil will influence the mechanical efficiency in such a way that a reduction of the viscosity will increase the mechanical efficiency of an engine. However, the reduced viscosity also causes the stress or strain on the bearings of the engine to be increased and the thickness of the oil film to be reduced.

But, the bearings of the engine are designed taking the highest possible stress or strain of the bearings during operation, i.e. at full load/power/speed, into consideration whereby the bearings are over-dimensioned when the engine is operating at partial or less than full load/power/speed. The specific degree of over-dimensioning is dependent on the specific type of bearing, the purpose of the engine (e.g. whether the engine is operating at constant number of revolutions/constant speed or at a variable number of revolutions/variable speed), etc.

By adjusting the viscosity according to the present invention, taking the actual load into consideration It can be ensured that as large a mechanical efficiency gain as possible in the given situation is obtained without causing excess stress or strain on the bearings of the engine.

The increased mechanical efficiency causes reduced fuel consumption and reduced emissions of the engine.

In a preferred embodiment, the step of adjusting the viscosity comprises increasing the temperature of the system oil resulting In decreased viscosity.

In this way, a very simple way of adjusting the viscosity is obtained.

In one embodiment, the increasing the temperature of the system oil is done by bypassing an amount of the system oil in an oil cooler 104, where the amount is dependent of the at least one parameter representing an actual load of the engine and in the viscosity parameter. This adjusting of the viscosity may e.g. be done by a valve 102 controlling the amount of system oil that is bypassed in the oil cooler 104 thereby directing the amount of system oil past the oil cooler 104 which increases the temperature of the system oil as a whole when introduced back into the engine. The valve is controlled using the mentioned parameters according to the present invention. The more system oil that bypassed the oil cooler 104 the more the temperature is increased.

In one embodiment, the viscosity parameter is an actually measured viscosity of the system oil. The measured viscosity of the system oil may be measured using standardised equipment such as e.g. viscosirator or the like.

In this way, the adjustment of the viscosity takes Into consideration the actual current viscosity of the system oil. This may be an important aspect since the stress or strain of the bearings will at any time be influenced by the specific viscosity of the system oil, which may ongoing be influenced e.g. by pollution of the oil during operation of the engine. By taking the actual viscosity of the system oil into consideration it may be ensured that viscosity is not increased too much and so ensuring as large a fuel efficiency gain as possible.

In an alternative embodiment, the viscosity parameter is a nominal or rated viscosity of the system oil. The nominal or rated viscosity of the system oil is the viscosity that the system oil has when new or when introduced into the engine for the first time. The nominal or rated viscosity is recommended by the designer of the specific engine and varies according to make and model of the specific type of engine.

In this way, the adjustment of the viscosity of the system oil according to the present invention is simplified since the nominal or rated viscosity is used as an estimate of the actual or current viscosity of the system oil. This avoids the need for equipment to measure the actual or current viscosity of the system oil thereby saving costs. The use of the nominal or rated viscosity as an estimate should preferably only be used when the present invention is applied to an engine with an insignificant or negligible amount of pollution of its system oil as such pollution influences the viscosity of the system oil and thereby the stress or strain of the bearings of the engine.

In one embodiment, the engine has a constant number of revolutions during operation.

In an alternative embodiment, the engine has a variable number of revolutions during operation.

In one embodiment, the step of adjusting is further done on the basis of an actual number of revolutions of the engine.

In this way, the actual number of revolutions may be used as an indication or an estimate for the actual load of the engine since the number of revolutions is a known indication or function of the load of an engine for engines that are directly coupled to a propeller or the like.

In one embodiment, the at least one parameter representing an actual load of the engine comprises: a parameter representing stress or strain on the bearings of the engine, and/or a parameter representing a maximum pressure in the cylinders of the engine, and/or a parameter representing a compression pressure in the cylinders of the engine, and/or a parameter representing a mean pressure in the cylinders of the engine.

In this way, even better indications of the actual load of the engine are taken into consideration when determining how the viscosity can be adjusted without compromising the engine, since the actual pressure condition in the engine's cylinders, i.e. maximal pressure, compression pressure and mean pressure, Is a main determining factor for the stress or strain on the bearings.

In one embodiment, the step of adjusting is done continuously, near-continuously or intermittently.

The present invention also relates to a system for reducing fuel consumption in a diesel engine when operating at less than full speed, which corresponds to the method of the present invention and have the same advantages for the same reasons.

More specifically, the invention relates to a system for reducing fuel consumption in a diesel engine, the system comprising: a viscosity regulating device adapted to adjust, when the engine is operating at less than full speed, a viscosity of a system oil from the engine resulting in a modified system oil, where the viscosity is adjusted so that the mechanical efficiency of the engine is increased when the modified system oil is provided to the engine and wherein the adjustment of the viscosity is done on the basis at least one parameter representing an actual load of the engine and a viscosity parameter of the system oil.

Advantageous embodiments of the system according to the present invention are defined in the sub-claims and described in detail in the following. The embodiments of the system correspond to the embodiments of the method and have the same advantages for the same reasons.

BRIEF DESCRIPTION OF THE DRAWINGS

These and other aspects of the invention will be apparent from and elucidated with reference to the illustrative embodiments shown in the drawing, in which:

FIG. 1 shows a schematic block diagram of one embodiment of the present invention.

DESCRIPTION OF PREFERRED EMBODIMENTS

FIG. 1 shows a schematic block diagram of one embodiment of the present invention. Shown is a schematic representation of at least one diesel engine (300), e.g. a two-stroke cross-head diesel engine. The exemplary engine comprises one lubricating system comprising so-called system oil (301) that normally is used for lubrication and cooling of the engine's bearings, cylinders and e.g. oil-cooled pistons as well as for activation and/or control of various valves or the like. Another lubricating system comprises an all-loss lubricant or cylinder oil (302) that normally is used for lubrication of the engine's cylinders, piston rings and piston skirt. Other types of diesel engines are four-stroke trunk piston diesel engines (which do not comprise cylinder oil). In principal the invention may be used in all types of reciprocating combustion engines.

The engine (300) corresponds to well-known prior art diesel engines except as explained in the following.

Further illustrated is a viscosity modification system (100) comprising a viscosity regulating device (101) according to the present invention which is connected to obtain system oil (301) preferably from the engine(s) (300). Alternatively, the viscosity modification system (101) may receive system oil from a tank (not shown) or the like instead of directly from the engine.

The viscosity regulating device (101) modifies (at least a part of) the received system oil (301) or more specifically adjust the viscosity of the received system oil (301) in response to a number of parameters resulting in a modified system oil (301'). In a preferred embodiment, the viscosity of the received system oil is modified simply by increasing the temperature of the received system oil resulting in decreased viscosity of the system oil.

The adjusting of the viscosity may in one embodiment be done by a valve controlling an amount of system oil that is bypassed in the oil cooler, thereby directing the amount of system oil past the cooler thereby increasing the temperature. The valve is controlled using the mentioned parameters. The more system oil that bypassed the cooler the more the temperature is increased, which provides a very simple way of regulating the viscosity in dependence on the relevant parameters.

The adjustment ensures that the mechanical efficiency of the engine (300) is increased when the modified system oil (301') is supplied back into the engine (300).

The parameters that the adjustment is made in response to comprises at least one parameter representing an actual load of the engine (300) and a viscosity parameter of the system oil (301).

The viscosity parameter may e.g. be a measured actual/current viscosity of the system oil (301), which is useful if the viscosity is likely to have changed due to pollution, etc. as described earlier. Alternatively, the viscosity parameter is a nominal or rated viscosity of the system oil (301) whereby equipment for measuring the actual/current viscosity does not need to be present, which saves cost and reduces the complexity of the system.

The engine may have a constant number of revolutions during operation. Alternatively, the engine may have a variable number of revolutions during operation. In one embodiment, the step of adjusting is further done on the basis of an actual number of revolutions of the engine so that the actual number of revolutions may be used as an additional estimate for the actual load of the engine since the number of revolutions is a known indication or function of the load of an engine for engines that are directly coupled to a propeller or the like. It is also possible to continuously or near-continuously measure the actual load of an engine e.g. by a torsion meter or the like.

In one embodiment, the at least one parameter representing an actual load of the engine comprises: a parameter representing stress or strain on the bearings of the engine, and/or a parameter representing a maximum pressure in the cylinders of the engine, and/or a parameter representing a compression pressure in the cylinders of the engine, and/or a parameter representing a mean pressure in the cylinders of the engine.

In this way, even better indications of the actual load of the engine are taken into consideration when determining how the viscosity can be adjusted without compromising the engine, since the actual pressure condition in the engine's cylinders, i.e. maximal pressure, compression pressure and mean pressure, is a main determining factor for the stress or strain on the bearings.

It is also possible to continuously or near-continuously measure the above pressures in the engine's cylinders e.g. using well-known commercially avail tools.

In this way reduced fuel consumption (and thereby emissions) for a diesel engine is obtained when the engine is operating at less than full speed.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The invention claimed is:

1. A method of reducing fuel consumption in a diesel engine the method comprising the steps of:
    obtaining system oil from said diesel engine when said diesel engine is operating at less than full power, said obtained system oil having a first viscosity parameter and a first temperature;
    passing at least some amount of the obtained system oil to a viscosity regulating device;
    bypassing a remaining amount of obtained system oil to an oil cooler; wherein the step of bypassing is done on the basis of at least one parameter representing an actual load of the engine and the first viscosity parameter of the obtained system oil;
    combining the bypassed system oil and the passed system oil to thereby create modified system oil, said modified system oil having a second viscosity parameter and a second temperature, wherein said second viscosity parameter is less than said first viscosity parameter and said second temperature is higher than said first temperature; and
    providing said modified system oil to said diesel engine.

2. A method according to claim 1, wherein the engine has a variable number of revolutions during operation.

3. A method according to claim 2, wherein the step of bypassing is further done on the basis of an actual number of revolutions of the engine.

4. A method according to claim 1, wherein the engine has a constant number of revolutions during operation.

5. A method according to claim 1, wherein said first viscosity parameter is a rated viscosity of the obtained system oil.

6. A method according to claim 1, said first viscosity parameter is an actually measured viscosity of the obtained system oil.

7. A method according to claim 1, wherein said at least one parameter representing an actual power of the engine comprises one or more selected from the group consisting of: a parameter representing stress or strain on the bearings of the engine, a parameter representing a maximum pressure in the cylinders of the engine, a parameter representing a compression pressure in the cylinders of the engine, and a parameter representing a mean pressure in the cylinders of the engine.

8. A method according to claim 1, wherein the step of bypassing is done according to any one selected from the group consisting of: continuous bypass, near-continuous bypass or intermittent bypass.

* * * * *